United States Patent [19]

Saulnier

[11] Patent Number: 4,807,140
[45] Date of Patent: Feb. 21, 1989

[54] ELECTRONIC LABEL INFORMATION EXCHANGE SYSTEM

[76] Inventor: Dominique C. Saulnier, 37-39, allée du Closeau, 93160 Noisy Le Grand, France

[21] Appl. No.: 670,377

[22] Filed: Nov. 9, 1984

[30] Foreign Application Priority Data

Nov. 10, 1983 [FR] France ................ 83 17867

[51] Int. Cl.⁴ ............................................. G05B 19/00
[52] U.S. Cl. ...................................... 364/468; 364/478; 235/376; 340/825.54
[58] Field of Search ............... 364/478, 468, 200, 900, 364/479; 235/375, 376, 377, 379, 380, 381, 382; 343/6.5 R, 6.5 CC, 6.5 SS, 6.8 CC; 340/572, 825.34, 825.35, 825.54

[56] References Cited

U.S. PATENT DOCUMENTS

| | | | |
|---|---|---|---|
| 3,521,280 | 7/1970 | Janco | 343/65 SS |
| 3,706,094 | 12/1972 | Cole | 343/6.5 SS |
| 3,859,624 | 1/1975 | Kriofsky | 343/6.8 R |
| 3,906,460 | 9/1975 | Halpern | 340/172 |
| 3,949,397 | 4/1976 | Wagner | 343/6.5 R |
| 4,068,232 | 1/1978 | Meyers | 343/6.8 R |
| 4,242,663 | 12/1980 | Slobodin | 343/6.5 SS |
| 4,325,126 | 4/1982 | Thoma | 364/478 |
| 4,353,064 | 10/1982 | Stamm | 235/382 |
| 4,367,402 | 1/1983 | Giraud | 235/380 |
| 4,388,524 | 6/1983 | Walton | 235/380 |
| 4,408,291 | 10/1983 | Gunzberg et al. | 364/468 |
| 4,450,525 | 5/1984 | Demuth et al. | 364/200 |
| 4,459,590 | 7/1984 | Saulnier | 365/192 |
| 4,473,883 | 9/1984 | Yoshida et al. | 364/468 |
| 4,510,495 | 4/1985 | Sigrimis et al. | 340/825.54 |
| 4,525,713 | 6/1985 | Barletta et al. | 340/825.54 |
| 4,546,241 | 10/1985 | Walton | 343/65 SS |
| 4,550,444 | 10/1985 | Uebel | 343/6.5 SS |
| 4,588,880 | 5/1986 | Hesser | 340/825.23 |
| 4,654,512 | 3/1987 | Giardosi | 235/376 |
| 4,656,463 | 4/1987 | Anders et al. | 340/825.54 |

FOREIGN PATENT DOCUMENTS

| | | |
|---|---|---|
| 0055639 | 7/1982 | European Pat. Off. . |
| 2494466 | 5/1982 | France . |
| 2513411 | 3/1983 | France . |
| 1397238 | 6/1975 | United Kingdom . |
| 1447099 | 8/1976 | United Kingdom . |
| 2060228 | 4/1981 | United Kingdom . |
| 2116748 | 9/1983 | United Kingdom . |

*Primary Examiner*—Jerry Smith
*Assistant Examiner*—Allen Mac Donald
*Attorney, Agent, or Firm*—Steele, Gould & Fried

[57] ABSTRACT

An electronic label data exchange system has work posts adapted for data transmission with objects passing through the posts and with a central control. The objects are provided with electronic labels having a non-volatile memory which may be cleared and written into by the work post devices. The work post fixed transmission devices each have a modulator-demodulator for connection to the control center, a coder-decoder connected to a receiving circuit and to a transmission circuit, and may also include a power transmission circuit for supplying the electronic circuits of the electronic labels with power. Each electronic label has a reception circuit and a transmission circuit in addition to the non-volatile memory. A local data exploitation circuit is connected to the modulator and to the demodulator disposed in each fixed transmission device.

7 Claims, 2 Drawing Sheets

ELECTRONIC LABEL INFORMATION EXCHANGE SYSTEM

BACKGROUND OF THE INVENTION

1. Field of the Invention

The present invention relates to an electronic label information exchange system.

2. Prior Art

For transmitting information, in particular in an industrial environment, at several different locations, each time between a moving object and a fixed data transmission means connected to a control center, it is known to provide said object with what is usually called an "electronic label". The control center can be connected to control machines operable to perform operations, depending on the object. The known electronic label comprises essentially a memory which can be written into and cleared, and a transmitting circuit and a receiving circuit for access thereto. The electronic label exchanges information with the fixed transmission means when in position.

When a large number of the transmission means are provided at an installation, and when they each cooperate simultaneously with moving objects, the data exchanged between them and a control center cannot all be processed or controlled simultaneously, especially if data transfer is extensive. The heavy traffic of data slows down the procedure to which the moving objects are to be subjected.

SUMMARY OF THE INVENTION

The purpose of the present invention is to provide a device allowing information to be exchanged simultaneously between a large number of fixed transmission means forming part of the same installation and the electronic labels of the same number of moving objects. The objects must be presented in front of fixed transmission means and their data processed without slowing down the procedure to which said objects are subjected, even when the data exchanged are long and numerous. The device of the invention must be able to be readily adapted to a large number of applications or to be readily modified when modifications are made to the manufacturing procedure or the like of an installation.

The present invention relates to an installation of the above mentioned type in which each fixed transmission means comprises a modulator-demodulator connected to a remote control center, a receiving circuit and a transmitting circuit connected to a coder-decoder and, if required, a power transmitting circuit for supplying the electronic circuits of the electronic labels with power. Each electronic label is of the type comprising a receiving circuit and a transmitting circuit and a non volatile memory which may be written into and cleared by the remote control center. Each fixed transmission means has a local data exploitation circuit connected to the modulator and to the demodulator as well as to the coder-decoder.

In a preferred embodiment of the invention, the local data exploitation circuit comprises a microprocessor connected to a program memory in which are stored all the elementary instructions required for all the processing likely to be effected by the microprocessor on or as a result of the data exchanged between the electronic labels and the transmission means. The instructions may relate to the data passed bwtween the labels and the remote control centers or between the microprocessors and the devices which they may control. The instructions may also affect the devices from which the microprocessor received external data. The microprocessor is also connected to a data memory in which are stored, for the application considered, the data for linking together all or part of said elementary instructions so as to form a processing program specific to the application considered.

BRIEF DESCRIPTION OF THE DRAWINGS

The present invention will be better understood from the detailed description of an embodiment taken as non limitative example and illustrated by the accompanying drawings in which.

DETAILED DESCRIPTION OF THE PREFERRED EMBODIMENTS

Figure 2:
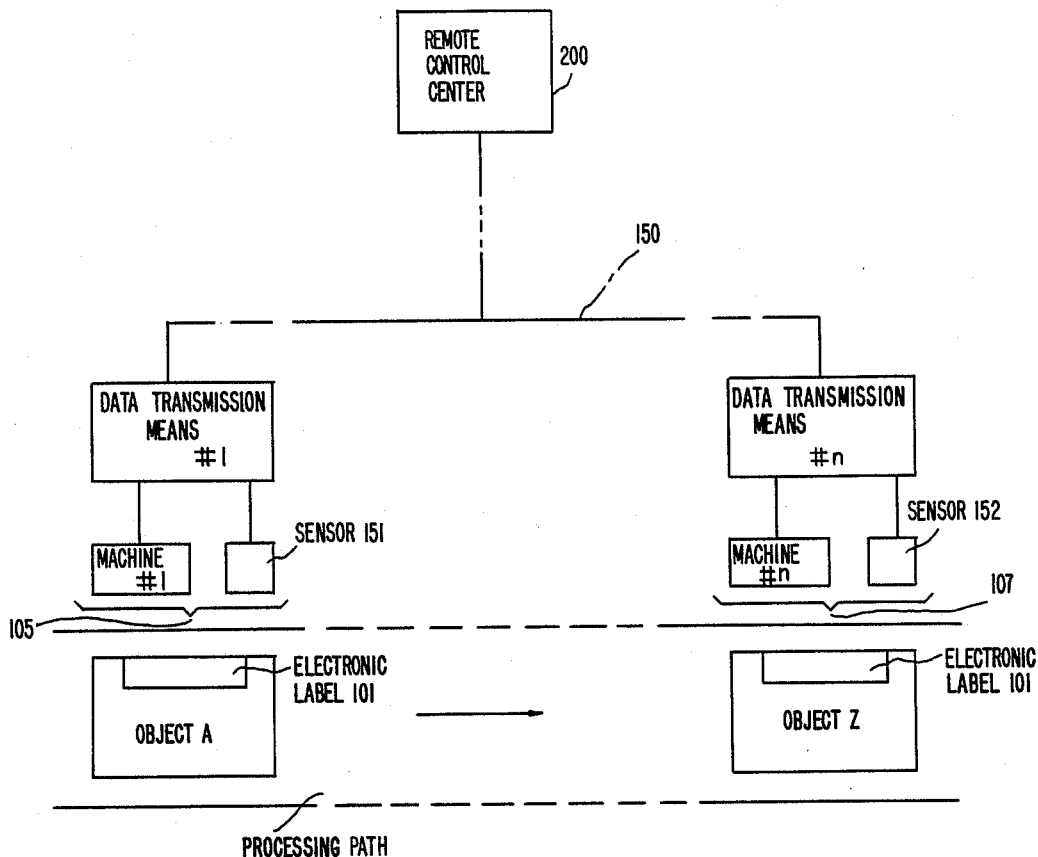
FIG. 2 is a block diagram of the data handling system.
Figure 3:
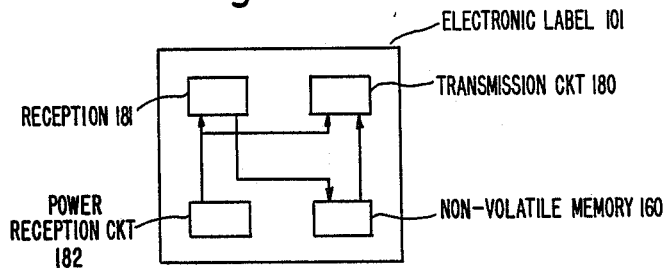
FIG. 3 is a block diagram of the electronic label.

The installation of which the present invention applies, is for example an automated industrial production line in which the moving objects to be machined and/or treated and/or handled are each provided with an electronic label 101 in FIG. 3, for example of the type described in French patent application No. 80 25035 or U.S. Pat. No. 4,459,590 that is the equivalent thereof. These objects, A and B in FIG. 2, pass through successive treatment and/or machining and/or handling posts 105,107 in FIG. 2 each equipped with a fixed information transmission means disposed so that the electronic labels themselves which are disposed appropriately on the moving objects, pass as close as possible within range of the fixed transmission means when these objects pass through said posts. The labels and the fixed transmission means then may exchange information concerning more especially the identification of the objects, the different operations which they have already undergone, which they are to undergo in the post considered, their subsequent destination, etc.... The different fixed information transmission means are connected to a control center.

It should however be understood that the invention is not limited tó such an application, but may be used in practice in all cases where several fixed means are each capable of exchanging information simultaneously with electronic labels carried by a moving objects passing, and should such be the case stopping, in front of this means.

Figure 1:
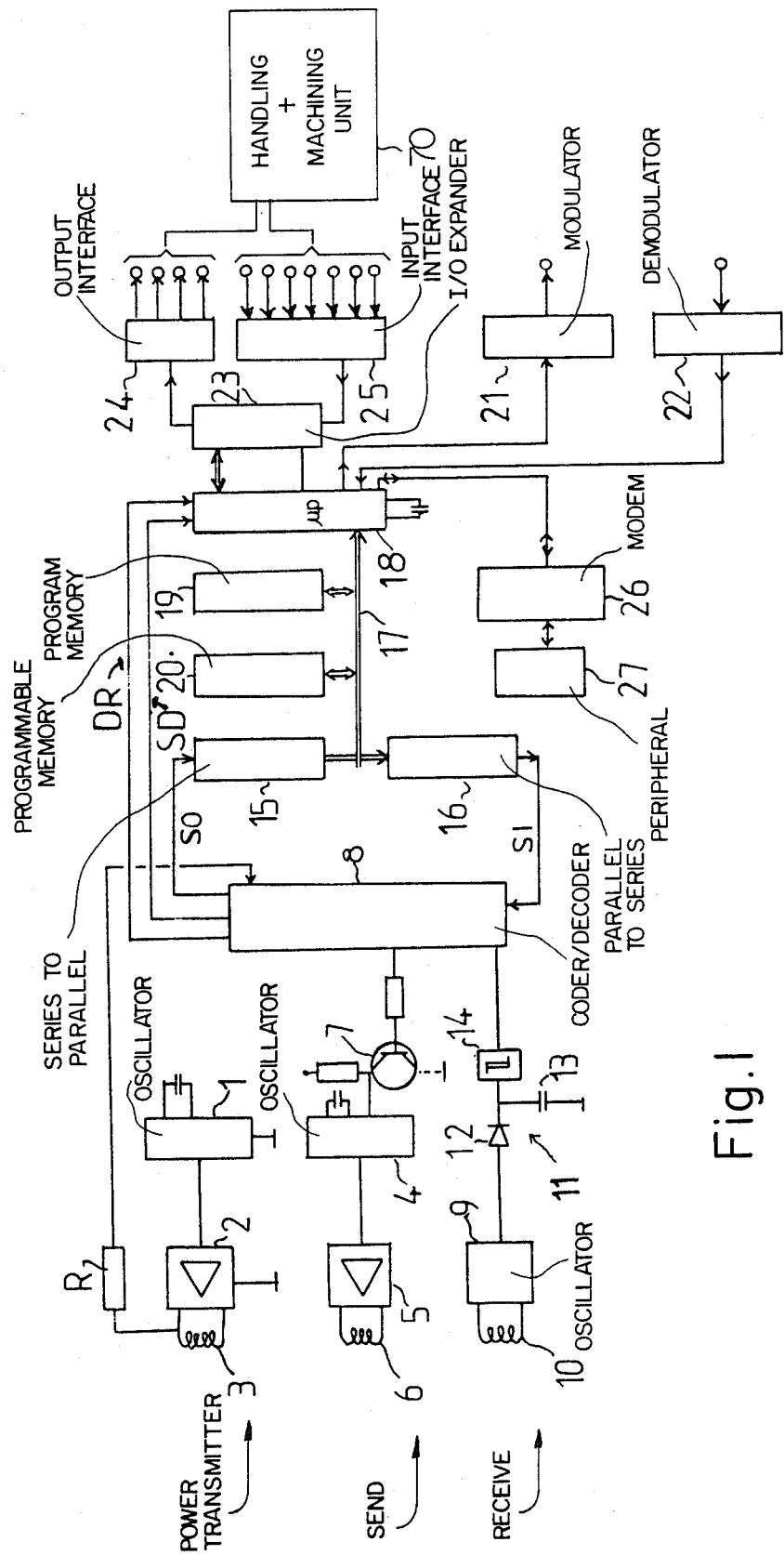
FIG. 1 is a block diagram of a fixed data transmission means in accordance with the invention.

The fixed transmission means shown in the drawing comprises an oscillator 1 connected to a power amplifier 2, itself connected to a coil 3 which transmits, by an induction, to a corresponding coil forming part of a circuit tuned to the frequency of the oscillator 1, disposed in an electronic label (known per se and not shown in FIG. 1), the energy required by the label for exchanging information with the fixed means when said label passes close to this means.

The transmission means then comprises a second oscillator 4 connected to an amplifier 5 itself connected to a transmitting coil 6. Oscillator 4 is further connected to a modulator 7 controlled by the coding outputs of a Manchester type coder-decoder 8. Modulator 7 is operative, for example, to cut off the oscillating circuit of oscillator 4.

The transmission means comprises a third oscillator 9 in which the coil 10 of the tuned circuit serves as coil for receiving the signal emitted by the electronic label 101, which it absorbs or not by induced eddy currents. Absorption of the signal causes a reduction in the amplitude of the output voltage of oscillator 9. This amplitude variation is demodulated by a demodulator 11, connected to the output of oscillator 9, which comprises a rectifying diode 12 followed by a capacitor 13. The output of demodulator 11 is connected to a filtering and shaping circuit 14 comprising for example a Schmitt trigger. The output of circuit 14 is connected to the decoding input of circuit 8.

The decoded signal series output S.O. of circuit 8 is connected to a series-parallel conversion circuit 15 and its series input S.I. for signals to be coded is connected to the output of a parallel-series conversion circuit 16.

The parallel output of circuit 15 and the parallel input of circuit 16 are connected to the bus 17 of a microprocessor (µP) 18. Microprocessor 18 is associated with a program memory 19 in which are stored all the elementary instructions required for all the processing likely to be effected by microprocessor 18 on the information exchanged between the electronic labels and the transmission means as well as between the microprocessor and all the circuits and devices which are connected thereto in the way described below. These elementary instructions are for example: reading an area of values (in the memory of the label), result of reading an area, reading a zone of values, result of reading a zone, writing a value in an area, result of writing in an area, etc . . . .

Microprocessor 18 is also associated with a memory 20 programmable by the user, which stores therein the data for linking together all or part of the instructions in memory 19 for forming the desired processing program.

Microprocessor 18 is further connected to a series transmitting modulator 21 and to a series receiving demodulator 22 which provide the connection between the microprocessor 18 and the remote control center (not shown) which is similarly connected to all the transmission means of the installation shown as connection 150 in FIG. 2.

Programming of memory 20 may be achieved either by remote loading of a program via demodulator 22, memory 20 being placed in the transmission means, or outside the means, memory 20, which is removable, being removed and disposed in an appropriate programming apparatus.

Microprocessor 18 is finally connected, via an input-output expander 23, to an output interface 24 and to an input interface 25. Interfaces 24 and 25 which comprise for example opto-electronic isolators are connected in a way not shown, to sensors 151,152 servo-mechanisms, machine 1 and machine n, and other devices, identified as handing and machining unit 70, required in the work post, in which the information transmission means in question is implanted for detecting the correction position of an object in this post for handling it, for starting the machining procedure, for discharging this object, etc . . . .

The DR (data received) and SD (send data) outputs of circuit 8 are connected in an appropriate way to microprocessor 18. Coil 3 is connected through resistor R of appropriate value to the clock signal input of circuit 8. The choice of frequencies of oscillators 1, 4 and 9 is effected in the same way as for circuits of the prior art.

Microprocessor 18 is finally connected to a modulator-demodulator 26, itself connected to a peripheral means 27 which may be a printer, a data input keyboard, a pocket calculator provided with appropriate connections, a video monitor, etc . . . . The peripheral means 27 is disposed close to the data transmission means and allows the monitoring and/or maintenance and/or modification of the data in memory 20 to be effected locally (i.e. at the work post itself), which is particularly advantageous should the control center break down.

Where an electronic label is fixed on an object which will be subjected to an industrial process in a production line, this label may either already comprise data relating to this object, or be blank or carry, any data unrelated to the object. In all cases, the data relating to the object may be introduced and stored in the label by means of the above described transmission means which is then placed upstream of the production line, or at a first post, respectively. With this means, not only can the non-volatile memory 160 (FIG. 3) of the label be completely cleared but new data may be introduced therein or certain data may be modified, just as that was possible with the means of the prior art. As stated in the background of the invention, the label includes transmission circuit 180, reception circuit 181, and power receptor circuit 182.

In each work post, the data stored in the label are read out by the data transmission means and exploited by its microprocessor 18. The microprocessor 18 controls, via circuits 23 and 24, the starting up of the machining, treatment or handling apparatus in the work post. Such activities are considered as soon as the microprocessor has received, from position sensors 151 connected to circuit 25, information to the effect that the object is in its correct place in the work post. When the work is finished, appropriate sensors signal the fact to the microprocessor via circuits 25 and 23 and the microprocessor possibly orders new data to be written into the label (e.g., information reflecting the kind of work which has just be effected, work to be effected subsequently, next destination, etc . . . ) and orders, via circuits 23 and 24, discharge of the object of the next work post or to a storage place).

At any time, microprocessor 18 may converse with the remote control center 200 via circuits 21 and line 150 22 but this dialogue is generally very limited for it is the microprocessor 18 itself which supervises all the work carried out at the work post.

The dialogue between microprocessor 18 and the remote control center may be fairly short, delayed and/or abbreviated relative to the work supervised by the microprocessor, and may even be very infrequent. This dialogue may for example be reduced to stopping orders issued by the control center should a break down occur in the production line, and to statistical counts of the different work carried out during a given period. As mentioned above, the data stored in memory 20 may be modified from the control center.

Consequently, the local data exploitation circuit of the invention allows a large number of work posts to operate simultaneously by using in a decentralized way the information contained in the electronic labels without interfering with each other, and so without slowing down operation of the production line.

I claim:

1. An electronic data exchange system for use with objects moving along a processing path having a plurality of work posts including handling and machining means thereat, the data exchange system comprising:
   fixed data transmission means disposed at the work posts;
   electronic labels on the objects, the electronic labels each having a non-volatile memory which can be cleared and written into by the fixed data transmission means;
   each fixed data transmission means having a modulator-demodulator for connecting the data transmission means to a remote control center, a coder-decoder connected to a receiving circuit and to a transmission circuit;
   each electronic label having a reception circuit, a transmission circuit and said non-volatile memory;
   a local data exploitation circuit connected to each fixed transmission means; and,
   a programmable memory and program memory in the fixed data transmission means, in which are stored a plurality of elementary instructions required for a plurality of procedures to be selectively effected by the data exploitation circuit, and the data exploitation circuit being operable responsive to the electronic labels and the remote control center to select and execute a sequence of instructions from said elementary instructions, specific to a particular situation.

2. Data exchange system according to claim 1, wherein the modulator-demodulator communicates with a peripheral means that is connected to the transmission circuit, the modulator-demodulator and peripheral means being in communication with the data exploitation device and allowing monitoring and maintenance of the data exchange system.

3. Data exchange system according to claim 1, further comprising a power transmission circuit in the data transmission means and a power receptor circuit in the electronic labels, the power transmission circuit being operable to supply electronic circuits of the electronic labels with power.

4. An electronic data exchange system for use with objects moving along a processing path having a plurality of work posts including handling and machining means thereat, the data exchange system comprising:
   fixed data transmission means disposed at the work posts;
   electronic labels on the objects, the electronic labels each having a non-volatile memory which can be cleared and written into by the fixed data transmission means;
   each fixed data transmission means having a modulator-demodulator for connecting the data transmission means to a remote control center, a coder-decoder connected to a receiving circuit and to a transmission circuit;
   each electronic label having a reception circuit, a transmission circuit and said non-volatile memory; and,
   a local data exploitation circuit connected to each fixed data transmission means;
   the local data exploitation circuit having a microprocessor connected to a program memory in which are stored elementary instructions defining process steps of the microprocessor during data exchange between the electronic labels and the data transmission means, and between the handling and machining means and the remote control center, and further including an input interface and an output interface connected to the microprocessor for exchanging information between the transmission circuit and the microprocessor and further including a programmable memory for storing sequenced instructions, said microprocessor having means to select, sequence and load the elementary instructions into the programmable memory to effect the data exchange.

5. An improved data exploitation device of the type responsive to an electronic label carried by objects passing a work post, including handling and machining means thereat and responsive to data from a remote control, the data exploitation device being operable to read and write information to and from the electronic label and the remote control the data exploitation device being operative to control at least one mechanism for performing operations based on data from the electronic labels, said at least one mechanism being part of the handling and machining means, the improvement comprising:
   the data exploitation device having a microprocessor, a program memory storing a plurality of elementary instructions including a plurality of procedures to be performed based upon data received from the electronic labels and the remote control, and a programmable memory for storing sequenced instructions subject to execution, the data exploitation circuit having means to select elementary instructions from the program memory, sequence the elementary instructions and load the elementary instructions into the programmable memory, whereby the data exploitation device is operable to selectively execute instructions as required for particular electronic labels and control data requirement;
   the data exploitation device including:
   a power amplifier operable to induce a current in the electronic labels coming within range of the power amplifier;
   an oscillator, modulator and coil for sending data to the electronic labels and a coil, demodulator and detector for receiving data from said electronic labels, said modulator and demodulator communicating with the electronic labels, the modulator and demodulator connected to a coder/decoder for coding, decoding and converting data sent and received form the electronic labels into a serial data steam;
   a series to parallel converter and a parallel to series converter for converting between the serial data stream and a parallel data pattern to and from at least said modulator and demodulator;
   the microprocessor responsive to data from the coder/decoder;
   at least part of the programmable memory and the program memory being readable and writable by the microprocessor;
   data interface means for communicating between the microprocessor and the remote control, and between the handling and machining means;
   a peripheral means separate from said data exploitation device and disposed adjacent the work post, operable to monitor and control operations of the data exploitation circuit.

6. An electronic data exchange system, comprising:

a plurality of objects bearing electronic labels, each of the labels having a non-volatile memory which can be cleared and written into, the objects being moved along a path including work posts, the work posts having controllable means for effecting data communications with the electronic labels and operations on the objects;

the work posts having a data exploitation device for the work posts including a microprocessor for reading and writing data to the electronic labels and for controlling operation of mechanisms effecting operations on the objects, the data exploitation circuit including a program memory having stored therein elementary instructions combinable and executable by the microprocessor for conducting a plurality of selectable operations on the object and the data exploitation circuit having a programmable memory for storing instructions to be executed, the data exploitation circuit being operable to select from the program memory, sequence, store in the programmable memory and execute instructions in response to data received from the electronic labels and from mechanisms controlled.

7. Data exchange system according to claim 6, further comprising a centralized remote controller communicating with the data exploitation devices at a plurality of the work posts, the data exploitation device also being responsive to select and execute program instructions based upon data from the centralized controller.

* * * * *